Jan. 25, 1927. 1,615,719
G. A. OLIVER
CHECKING AND ASSEMBLY TABLE
Filed Aug. 24, 1926
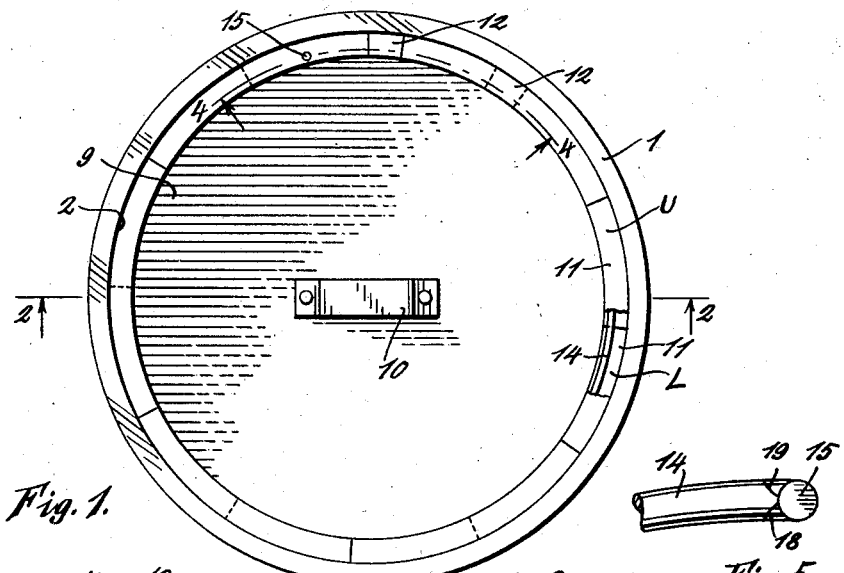
Fig. 1.
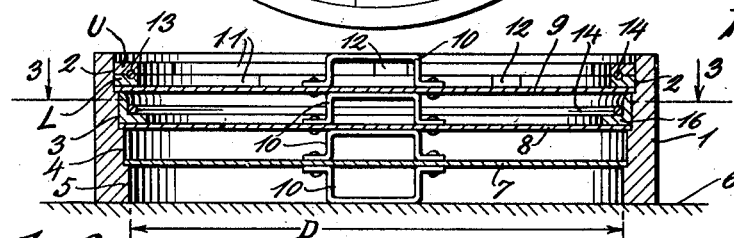
Fig. 2.
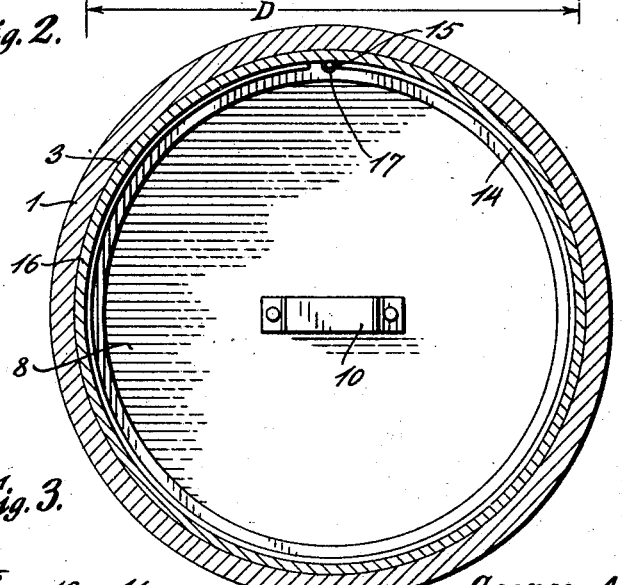
Fig. 3.
Fig. 4.
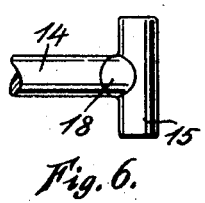
Fig. 5.
Fig. 6.
Inventor
George A. Oliver.
By A. J. O'Brien
Attorney Patented Jan. 25, 1927.

1,615,719

UNITED STATES PATENT OFFICE.

GEORGE A. OLIVER, OF CLEBURNE, TEXAS.

CHECKING AND ASSEMBLY TABLE.

Application filed August 24, 1926. Serial No. 131,249.

This invention relates to improvements in devices for checking sizes, fitting up and splicing segments of universal cylindrical packing and for testing springs for true diameters, set and opening.

In my copending application Serial No. 70,479, filed November 21, 1925, I have described and claimed a machine for grinding segments of universal cylindrical packing so that they may be reemployed after they have once been worn to a state in which they do not form a satisfactory seal.

In the regrinding of these universal cylindrical packing segments, metal is removed from the circumferential surface and as each segment is originally made to extend through an arc of 60 degrees, it is evident that when metal is removed from the outer circumference the segments will, in effect, become shortened so that six of these segments will no longer make a complete circle when assembled end to end. In addition to the change thus produced by regrinding, the ends of the segments will naturally become worn, while in the engine and these two variations will eventually make the segments so short that they can no longer be used to form a satisfactory seal.

It is the object of this invention to produce a device in which the reground rings may be assembled and by means of which it is possible to determine the exact length of additional segments which must be inserted in order to make up for the end wear and for the regrinding of the segments.

In order to describe my invention so that it may be readily understood, reference will now be had to the accompanying drawing in which it has been illustrated, and in which:

Fig. 1 is a plan view of my improved check device and assembly table showing one set of segments in place therein;

Fig. 2 is a section taken on line 2—2, Fig. 1;

Fig. 3 is a section taken on line 3—3, Fig. 2;

Fig. 4 is a section taken on line 4—4, Fig. 1, this section extending through the packing segments only;

Fig. 5 is a top plan view of one end of the spring; and

Fig. 6 is a side elevation of the portion shown in Fig. 5.

My improved checking device and fitting table is of a very simple construction and consists of a cylindrical ring 1 whose inner surface is composed of a plurality of annular cylindrical circular surfaces which have been designated by reference numerals 2, 3, 4 and 5. The diameter of the cylindrical surface designated by numeral 5 may be considered as being the same as the interior diameter of an engine cylinder before it has been subjected to any reboring operation. The diameter of the surface designated by numeral 4 is equal to the interior diameter of the same cylinder after the first reboring operation. Surfaces 3 and 4 have diameters corresponding respectively with the diameter of the cylinder after the second and third reboring operation.

It is apparent that since this device has a plurality of cylindrical surfaces which correspond in diameter to the diameter of the cylinder to which the packing segments are to be fitted, that if the plurality of segments are assembled so as to exactly fit one of these surfaces, they will obviously also fit an engine cylinder of the same diameter.

When the surface to be fitted is the one indicated by numeral 5, the device may be placed on a flat surface, such as that indicated by reference numeral 6 which then serves as a supporting surface for the segments while they are being fitted into a complete circle. When any of the other surfaces 2, 3 or 4 is to be employed, it is necessary to provide plates of the proper diameter to fit these surfaces. For this purpose I have provided three plates, which have been numbered 7, 8 and 9. These plates correspond respectively to the surfaces 4, 3 and 2. As the operation of fitting the segments is the same, regardless of the diameter, we shall, for the purpose of explaining this operation, assume a case in which the segments are to be fitted to the surface 2. The plate 9 is put into place and rests on the shoulder between the surfaces 2 and 3 in the manner shown. As the diameter of the surface 2 is quite large being over 23 inches it becomes necessary to support the plates at their centers or else to make them of such heavy material that they will become difficult to handle. For the purpose of supporting the centers of the plates, I have provided plate 7 with two handle portions 10, one of which is secured to the under side and the other to the upper surface of this plate. These handles are made of such a dimension that their height is equal to the distance between the supporting surface 6 and the bottom of the plate 7. In order to make the distance between the plates equal to the distance between the supporting surface 6 and the under surface of plate 7, the height of the circular surface 5 is less than the corresponding dimension of the surfaces 2, 3 and 4 by the thickness of the plate. By this arrangement all the handle portions 10 can be made duplicates of each other and each serves to support the plate directly above it in the manner shown in Figure 2.

Let us now assume that we have a number of cylinder packing segments such as those indicated by numeral 11, which have been reground to fit the diameter of the surface 2 and whose ends have been slightly worn. It is evident that six of these segments will not make a complete circle when they are placed end to end and it is therefore necessary to add to each of the two layers of segments a short segmental section 12 of the proper length to complete the circle.

This can readily be done in the following manner. First, however, let us explain that the universal cylinder packing of the type to which reference is herein made is formed from two similar but reversely arranged sections which have been indicated on the drawing by the letters L and U, representing respectively the lower and the upper layer of sections. The adjacent surfaces of these sections have semi-cylindrical grooves 13 for the reception of a circular ring 14 whose function it is to force the sections outwardly against the surface of the cylinder. The sections in the upper and lower layers are staggered so that the joints in one layer are spaced half way between the joints in the other layer in the manner indicated by full and dotted radial lines in Fig. 1. The ring 14 is provided with a transversely extending dowel pin 15 which extends at right angles to the plane of the ring. Two of the segments are provided with openings for the reception of the ends of these dowel rings which serves to hold these segments in the relation in which the other segments are to be placed. The reground segments which are now to be employed and which it is desired to assemble so as to form a complete ring, are carefully placed on the supporting surface 9, each segment having its end in contact with the adjacent segment. As before explained six segments will not form a complete circle but will leave a gap and this gap is filled in by a short segment which has been indicated by numeral 12. The upper layer of segments is fitted in the same manner. During this fitting operation it is not necessary that the spring 14 should be in place, but when the segments are placed in the piston groove where they are to be used, this spring must naturally be put into place in the manner shown in Figures 1 and 2.

It is the function of the ring 14 to produce a force tending to move the segments outwardly against the surface of the cylinder. In order that this spring shall perform its function properly, it must be very carefully bent so that it will act with equal force on all of the segments. It is apparent that if the ring 14 is not perfectly true that it will not perform its function in a satisfactory manner. In order to test the spring so as to determine whether or not it is properly curved, I have provided a testing ring 16 which, in the illustration, is made with an outside diameter that corresponds to the diameter of the surface 3. This ring has an L-shaped cross section and the inside diameter of the vertical wall of this ring is such that when the ring 14 is put in place therein and properly fitted, the ring will be of the proper size to be employed in connection with at least three different sizes or diameters of packing segments. It is evident that when the plate 9 is removed and the ring is put into place in the manner shown in Figures 2 and 3, that the observer can very readily tell whether the ring is perfectly round or not. If it should deviate from a true circle, this portion must be marked, and the ring removed and subjected to a peaning operation for the purpose of producing the desired curvature. The ring 16 is provided with an opening 17 for the reception of the dowel pin 15.

After the sections have been assembled to fit one of the surfaces of the testing device, these sections are placed in a box and designated by number or otherwise identified so that when it is desired to replace the packing segments of a piston with a new set, the assembly of segments that have been fitted to a surface of the desired diameter can readily be selected.

In Figures 5 and 6 I have shown one end of the spring 14 and have shown a dowel pin 15 attached thereto. This is usually attached in the following manner. The end of the ring to which the pin is to be attached is beveled in the manner indicated by numeral 18. The spring is then brought into close proximity to the dowel pin 15 and welded thereto by a gas weld which deposits the material indicated by numeral 19. In this manner the dowel pin 15 can be attached without annealing the spring. On the drawing I have shown the members 12 as being comparatively short, in actual practice, however, they should be equal to about one-half of the length of a full segment since thirteen full segments are ground for one ring the extra segments can then be made by cutting one of the segments into two parts. The short segments that are thus made can be laid onto the segments in place and the amount to be removed marked and then cut off so as to allow a small clearance opening.

From the above it will be seen that I have provided a very simple checking device and assembly table by means of which reground and worn segments can be readily fitted to any desired diameter of cylinder and by means of which it is possible to test the curvature of the springs so as to assure that this will act equally on all of the segments in each set.

Having now described the invention what is claimed as new is:

1. A checking device and assembly table for use in assembling reground and worn segments of universal cylindrical packing comprising a member having an opening formed of a plurality of short cylindrical surfaces each of which differs in diameter from the other, said surfaces having an annular shoulder at their point of junction and supporting plates resting on said shoulders.

2. A checking device and assembly table for use in assembling reground and worn segments of universal cylindrical packing comprising a member having an opening formed of a plurality of short cylindrical surfaces, each of which differs in diameter from the other, said surfaces having an annular shoulder at their point of junction, supporting plates resting on said shoulders and means carried by each of said plates for supporting the plate directly above it.

In testimony whereof I affix my signature.

GEORGE A. OLIVER.